United States Patent [19]

Rubin

[11] Patent Number: 4,554,145

[45] Date of Patent: Nov. 19, 1985

[54] PREPARATION OF CRYSTALLINE SILICATE ZEOLITE BETA

[75] Inventor: Mae K. Rubin, Bala Cynwyd, Pa.

[73] Assignee: Mobil Oil Corporation, New York, N.Y.

[21] Appl. No.: 600,681

[22] Filed: Apr. 16, 1984

[51] Int. Cl.$^4$ .............................................. C01B 33/28
[52] U.S. Cl. .................................. 423/328; 423/329; 502/62; 502/77
[58] Field of Search ............................... 423/326–333; 502/60, 62, 77

[56] References Cited

U.S. PATENT DOCUMENTS

| | | | |
|---|---|---|---|
| 3,247,195 | 4/1966 | Kerr ..................................... | 423/329 |
| 3,308,069 | 3/1967 | Wadlinger et al. .................. | 423/328 |
| 3,459,676 | 8/1969 | Kerr ............................... | 423/328 X |
| 4,331,643 | 5/1982 | Rubin et al. ....................... | 502/77 X |
| 4,372,930 | 2/1983 | Short et al. ......................... | 423/326 |

OTHER PUBLICATIONS

Lok et al., "Zeolites" 1983, vol. 3, pp. 282–291.

*Primary Examiner*—Edward J. Meros
*Attorney, Agent, or Firm*—Alexander J. McKillop; Michael G. Gilman; Marina V. Schneller

[57] ABSTRACT

This invention relates to a new method for synthesis of zeolite Beta, to the zeolite Beta product of that new method and to use of said zeolite Beta prepared in accordance herewith as a catalyst for organic compound, e.g. hydrocarbon compound, conversion. In the disclosed method for preparing zeolite Beta a dibenzyl-1,4-diazabicyclo [2.2.2] octane compound is added to the synthesis reaction mixture.

12 Claims, No Drawings

PREPARATION OF CRYSTALLINE SILICATE ZEOLITE BETA

BACKGROUND OF THE INVENTION

1. Field of the Invention

This invention relates to a new method for synthesis of crystalline silicate identified as zeolite Beta, to the crystalline silicate product of that new method and to use of the crystalline silicate prepared in accordance herewith as a catalyst for organic compound, e.g. hydrocarbon compound, conversion.

2. Discussion of Prior Art

Crystalline zeolite Beta and its conventional preparation are taught by U.S. Pat. No. 3,308,069, the entire disclosure of which is incorporated herein by reference. It has a distinctive X-ray diffraction pattern which identifies it from other known crystalline silicates.

Applicant knows of no prior art methods for preparing crystalline zeolite Beta utilizing the present improved method.

U.S. Pat. No. 4,296,083 teaches a method for synthesis of high silica zeolites of intermediate pore size involving careful control of reaction mixture content and the presence of an organic nitrogen-containing cation source, not including a dibenzyl-1,4-diazabicyclo[2.2.2]octane compound. U.S. Pat. Nos. 3,699,139 and 3,783,124 teach use of benzyltrimethylammonium ions as directing agents in synthesis of crystalline materials other than zeolite Beta. U.S. Pat. No. 3,947,482 describes a method for synthesis of open pore zeolite such as offretite by hydrothermal reaction of a silica source, alumina source, sodium hydroxide and/or potassium hydroxide in the presence of a zeolite nucleation slurry synthesized from a mixture of a silica source, alumina source, sodium hydroxide and/or potassium hydroxide and an organic template not being a dibenzyl-1,4-diazabicyclo[2.2.2]octane compound. Zeolite ZSM-4 is shown to be synthesized in U.S. Pat. No. 4,331,643 from a reaction mixture containing as a directing agent triethylenediamine, also known as 1,4-diazabicyclo[2.2.2]octane.

SUMMARY OF THE INVENTION

A method for preparing crystalline silicate identified as zeolite Beta exhibiting catalytic activity and other valuable properties is provided which comprises forming a reaction mixture containing sources of alkali metal oxide, an organic nitrogen-containing cation, an oxide of aluminum, an oxide of silicon and water and having a composition, in terms of mole ratios, within the following ranges:

|  | Broad | Preferred |
|---|---|---|
| $SiO_2/Al_2O_3$ | 5–250 | 10–50 |
| $H_2O/OH^-$ | 10–100 | 20–80 |
| $OH^-/SiO_2$ | 0.09–0.8 | 0.2–0.6 |
| $R/(R + M)$ | 0.1–0.8 | 0.1–0.6 | wherein R is a cation derived from a dibenzyl-1,4-diazabicyclo[2.2.2]octane compound and M is an alkali metal ion, and maintaining the mixture until crystals of the crystalline zeolite Beta are formed. The quantity of $OH^-$ is calculated only from the inorganic sources of alkali without any organic base contribution. Thereafter, the crystals are separated from the liquid and recovered. Reaction conditions required consist of heating the foregoing reaction mixture to a temperature of from about 80° C. to about 150° C. for a period of time of from about 24 hours to about 200 days. A more preferred temperature range is from about 130° C. to about 140° C. with the amount of time at a temperature in such range being from about 24 hours to about 30 days.

The digestion of the gel particles is carried out until crystals form. The solid product is separated from the reaction medium, as by cooling the whole to room temperature, filtering and water washing.

EMBODIMENTS

When the crystalline silicate Beta is synthesized in accordance with the present method, it exhibits silica/alumina mole ratios over a wide range and significant catalytic activity for certain conversions of interest, including low pressure hydrocracking and hydroisomerization dewaxing.

The particular effectiveness of the presently required different organic directing agent, i.e. the dibenzyl-1,4-diazabicyclo[2.2.2]octane compound, hereafter more particularly described, when compared with other directing agents, such as that identified in U.S. Pat. No. 3,308,069, is believed due to its ability to function as a template in the nucleation and growth of zeolite Beta crystals.

The reaction mixture composition for the synthesis of synthetic crystalline silicate hereby can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing zeolite Beta can be supplied by one or more essential reactants and they can be mixed together in any order. For example, any oxide can be supplied by an aqueous solution, sodium hydroxide or by an aqueous solution of a suitable silicate; the organic cation can be supplied by the directing agent compound of that cation, such as, for example, the hydroxide or a salt, e.g. halide, such as chloride or bromide. The reaction mixture can be prepared either batchwise or continuously. Crystal size and crystallization time for the zeolite Beta composition will vary with the exact nature of the reaction mixture employed.

The organic directing agent required of the present method is a dibenzyl-1,4-diazabicyclo[2.2.2]octane compound or mixtures thereof. The compound may be, as non-limiting examples, the hydroxide or the halide. The most preferred directing agent is the chloride salt. The directing agent may be depicted as follows:

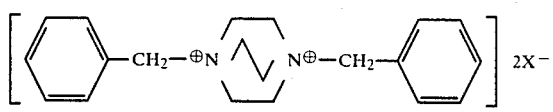

wherein X is an anion selected from the group consisting of hydroxide and halide, e.g. chloride, bromide and iodide.

The zeolite Beta composition as prepared hereby can also be identified, in terms of mole ratios of oxides and in the anhydrous state, as follows:

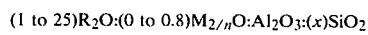

wherein M is at least one cation having a valence n, R is the cation derived from a dibenzyl-1,4-diazabicyclo[2.2.2]octane compound, above described, and x is from about 5 to greater than about 200.

The original cations can be replaced, at least in part, by calcination and/or ion exchange with another cation. Thus, the original alkali metal cations are exchanged into a hydrogen or hydrogen ion precursor form or a form in which the original cation has been replaced by a metal of Groups IIA, IIIA, IVA, IB, IIB, IIIB, IVB, VIB or VIII of the Periodic Table. Thus, for example, it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

The X-ray diffraction pattern of the crystalline silicate identified as zeolite Beta has the characteristic lines shown in Table 1.

TABLE 1

| Interplanar d-Spacing (A) | Relative Intensity ($I/I_o$) |
|---|---|
| 11.5 ± 0.4 | M-S |
| 7.4 ± 0.2 | W |
| 6.6 ± 0.15 | W |
| 4.15 ± 0.10 | W |
| 3.97 ± 0.10 | VS |
| 2.05 ± 0.05 | W |

These values were determined by standard technique. The radiation was the K-alpha doublet of copper, and a diffraction equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$ where $I_o$ is the intensity of the strongest line or peak, and d (obs.), the interplanar spacing in Angstrom units (A) corresponding to the recorded lines, were calculated. In Table 1 the relative intensities are given in terms of the symbols W=weak, M=medium, S=strong and VS=very strong. Ion exchange of the sodium ions with cations reveals substantially the same pattern with some minor shifts in interplanar spacing and variation in relative intensity. Other minor variations can occur depending on the silicon to aluminum ratio of the particular sample, as well as if it has been subjected to thermal treatment.

While the crystalline silicate of the present invention may be used in a wide variety of organic compound, e.g. hydrocarbon compound, conversion reactions, it is notably useful in the processes of low pressure hydrocracking, hydroisomerization dewaxing and cracking. Other conversion processes for which improved zeolite Beta may be utilized in one or more of its active forms include, for example, hydrocracking and converting light aliphatics to aromatics such as in U.S. Pat. No. 3,760,024.

Synthetic zeolite Beta prepared in accordance herewith can be used either in the organic nitrogen-containing and alkali metal contaning form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to zeolite Beta such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

Synthetic zeolite Beta, when employed either as an adsorbent or as a catalyst in a hydrocarbon conversion process, should be dehydrated at least partially. This can be done by heating to a temperature in the range of from about 200° C. to about 600° C. in an inert atmosphere, such as air, nitrogen, etc. and at atmospheric or subatmospheric pressures for between 1 and 48 hours. Dehydration can also be performed at lower temperature merely by placing the zeolite in a vacuum, but a longer time is required to obtain a particular degree of dehydration. The thermal decomposition product of the newly synthesized zeolite Beta can be prepared by heating same to a temperature up to about 550° C. for from 1 hour to about 48 hours.

As above mentioned, synthetic zeolite Beta prepared in accordance herewith can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange technique would be to contact the synthetic zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

Regardless of the cation replacing the alkali metal in the synthesized form of the zeolite Beta, the spatial arrangement of the aluminum, silicon and oxygen atoms which form the basic crystal lattices of zeolite Beta remains essentially unchanged by the described replacement of alkali metal as determined by taking an X-ray powder diffraction pattern of the ion-exchanged material.

The crystalline silicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the zeolite Beta hereby prepared with another material resistant to the temperatures and other conditions employed in certain organic conversion processes. Such matrix materials include active and inactive materials and synthetic or naturally occurring zeolites as well as incorganic materials such as clays, silica and/or metal oxides, e.g. alumina. The latter may be either naturally occurring or in the form of gelatinous precipitates, sols or gels including mixtures of silica and metal oxides. Use of a material in conjuction with the zeolite Beta, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized zeolite Beta include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite Beta catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and inorganic oxide gel matrix vary widely with the crystalline silicate content ranging from about 1 to about 90 percent by weight, and more usually in the range of about 2 to about 50 percent by weight of the composite.

Employing a catalytically active form of the composition of this invention containing a hydrogenation component, reforming stocks can be reformed employing a temperature between 370° C. and 540° C. The pressure can be between 100 and 1000 psig, but is preferably between 200 and 700 psig. The liquid hourly space velocity is generally between 0.1 and 10 hr$^{-1}$, preferably between 0.5 and 4 hr$^{-1}$ and the hydrogen to hydrocarbon mole ratio is generally between 1 and 20, preferably between 4 and 12.

The catalyst can also be used for hydroisomerization of normal paraffins, when provided with a hydrogenation component, e.g. platinum. Hydroisomerization is carried out at a temperature between 90° C. to 370° C., preferably 140° C. to 290° C., with a liquid hourly space velocity between 0.01 and 2 hr$^{-1}$, preferably between 0.25 and 0.50 hr$^{-1}$, employing hydrogen such that the hydrogen to hydrocarbon mole ratio is between 1 and 5. Additionally, the catalyst can be used for olefin or aromatics isomerization employing temperatures between 0° C. and 370° C.

The catalyst can also be used for hydroisomerization of normal paraffins, when provided with a hydrogenation component, e.g. platinum. Hydroisomerization is carried out at a temperature between 90° C. to 370° C., preferably 140° C. to 290° C., with a liquid hourly space velocity between 0.01 and 2 hr$^{-1}$, preferably between 0.25 and 0.50 hr$^{-1}$, employing hydrogen such that the hydrogen to hydrocarbon mole ratio is between 1 and 5. Additionally, the catalyst can be used for olefin or aromatics isomerization employing temperatures between 0° C. and 370° C.

The catalyst can also be used for reducing the pour point of gas oils. This process is carried out at a liquid hourly space velocity between about 10 and about 30 hr$^{-1}$ and a temperature between about 400° C. and about 540° C.

Other reactions which can be accomplished employing the catalyst of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the sorbant material, the decrease in pressure caused the monostat to open a valve which admitted more adsorbate vapor to the chamber to restore the above control pressures. Sorption was complete when the pressure change was not sufficient to activate the monostat. The increase in weight was calculated as the adsorption capacity of the sample in g/100 g of calcined adsorbant.

EXAMPLE 1

A 29.0 gram quantity of dibenzyl-1,4-diazabicyclo[2.2.2]octane chloride, prepared as hereinafter indicated, was dissolved in a solution of 21.6 grams sodium aluminate (43.3% $Al_2O_3$ and 32.2% $Na_2O$), 12.9 grams 50% NaOH solution and 65.0 grams water. The resulting mixture was then added to 174.0 grams 30% solution of colloidal silica. The total was then thoroughly mixed. The mixture, which had the composition in mole ratios:

| | |
|---|---|
| $SiO_2/Al_2O_3$ = | 9.5 |
| $H_2O/OH^-$ = | 27.8 |
| $OH^-/SiO_2$ = | 0.44 |

-continued

| | |
|---|---|
| R/(R + M) = | 0.17 | was then allowed to crystallize in a polypropylene jar under static conditions at 99° C. for 119 days. The product crystals were separated from the remaining mixture, filtered, washed with water and dried at 110° C.

The crystalline product was submitted for X-ray diffraction analysis.

Table 2 lists the X-ray diffraction pattern of the crystalline product of this example. The crystals were dried at 110° C. in air prior to X-ray analysis.

TABLE 2

| Interplanar d-Spacings (A) | Observed 2 × Theta | Relative Intensities, I/I$_o$ |
|---|---|---|
| 11.4 | 7.78 | M-S |
| 6.5 | 13.60 | W |
| 4.15 | 21.40 | W-M |
| 3.97 | 22.40 | VS |
| 3.02 | 29.6 | W |
| 2.09 | 43.20 | W |

These X-ray results indicate a crystalline zeolite Beta, with a trace of zeolite P-type crystalline material.

A sample of the product of this example was calcined at 500° C. for 16 hrs. in air, and then tested for sorption properties. The results indicated:
11.3 wt. % cyclohexane sorbed,
8.3 wt. % n-hexane sorbed, and
19.9 wt. % water sorbed.

EXAMPLE 2

A 29.0 gram quantity of dibenzyl-1,4-diazabicyclo[2.2.2]octane chloride was dissolved in a solution of 17.0 grams sodium aluminate (43.3% Al$_2$O$_3$ and 32.2% Na$_2$O), 11.0 grams 50% NaOH solution and 65.0 grams water. The resulting mixture was then added to 190.0 grams 30% solution of colloidal silica. The total was then thoroughly mixed. The mixture, which had the composition in mole ratios:

| | |
|---|---|
| SiO$_2$/Al$_2$O$_3$ = | 13.15 |
| H$_2$O/OH$^-$ = | 35.8 |
| OH$^-$/SiO$_2$ = | 0.33 |
| R/(R + M) = | 0.20 | was then allowed to crystallize in a polypropylene jar under static conditions at 100° C. for 169 days. The product crystals were separated from the remaining mixture, filtered, washed with water and dried at 110° C.

The crystalline product was submitted for chemical analysis and X-ray diffraction analysis. Chemical analysis proved the composition of the product crystals to be as follows:

| | |
|---|---|
| 1.22 wt. % | N |
| 2.8 wt. % | Na |
| 8.9 wt. % | Al$_2$O$_3$ |
| 65.8 wt. % | SiO$_2$ |
| 79.62 wt. % | Ash |
| 12.6 | SiO$_2$/Al$_2$O$_3$ molar ratio |

Table 3 lists the X-ray diffraction pattern of the crystalline product of this example. The crystals were dried at 110° C. in air prior to X-ray analysis.

TABLE 3

| Interplanar d-Spacings (A) | Observed 2 × Theta | Relative Intensities, I/I$_o$ |
|---|---|---|
| 11.8 | 7.50 | M-S |
| 6.5 | 13.70 | W |
| 4.13 | 21.50 | W-M |
| 3.97 | 22.40 | VS |
| 3.03 | 29.50 | W |

These X-ray results indicate a 60% crystalline zeolite Beta with a minor amount of crystalline mordenite material.

A sample of the product of this example was calcined at 500° C. for 16 hrs. in air, and then tested for sorption properties. The results indicated:
10.0 wt. % cyclohexane sorbed,
9.9 wt. % n-hexane sorbed, and
21.8 wt. % water sorbed.
The surface area of the product of this example was measured to be 363 m$^2$/gm.

EXAMPLE 3

In order to demonstrate the special ability of the presently required directing agent, i.e. the dibenzyl-1,4-diazabicyclo[2.2.2]octane compound, compared to other similar but different compounds, to function as a template in the present method for nucleation and growth of zeolite Beta crystals, the following experiment is noted.

A 25.0 gram quantity of 1,4-biazabicyclo[2.2.2]octane was dissolved in a solution of 21.6 grams of sodium aluminate, 12.9 grams of 50% NaOH solution and 65.0 grams of water. The resulting mixture was then added to 174.0 grams of colloidal silica (30% solution). The total was then thoroughly mixed. The mixture, which had the composition in mole ratios:

| | |
|---|---|
| SiO$_2$/Al$_2$O$_3$ = | 9.5 |
| H$_2$O/OH$^-$ = | 35.8 |
| OH$^-$/SiO$_2$ = | 0.33 |
| R/(R + M) = | 0.36 | when R is 1,4-biazabicyclo[2.2.2]octane, was then allowed to crystallize in a polypropylene jar under static conditions at 100° C. for 146 days. The product crystals were separated from the remaining mixture, filtered, washed with water and dried.

The dried crystalline product was submitted for X-ray diffraction analysis, the results of which indicated 105% crystalline ZSM-4, with no zeolite Beta present. A sample of the crystalline product was also chemically analyzed, indicating the following composition:

| | |
|---|---|
| 1.56 wt. % | N |
| 5.40 wt. % | Na |
| 13.3 wt. % | Al$_2$O$_3$ |
| 59.9 wt. % | SiO$_2$ |
| 82.8 wt. % | Ash |
| 7.7 | SiO$_2$/Al$_2$O$_3$ molar ratio |

This experiment appears as Example 3 in U.S. Pat. No. 4,331,643, incorporated entirely herein by reference.

EXAMPLE 4

Preparation of dibenzyl-1,4-diazabicyclo[2.2.2]octane chloride

A 192 gram quantity of diazabicyclo[2.2.2]octane (1.71 moles) was dissolved in 800 ml of nitromethane. To this solution, 478 grams of benzyl chloride (3.78 moles) was added slowly with stirring. Agitation was discontinued when all the benzyl chloride was added. On standing overnight, at room temperature, a crystalline product had formed. The crystals were filtered and washed in acetone and ether. Yield was 547.4 grams (88%). Chemical analysis of the product crystals indicated the following:

|          |    |
|----------|----|
| 62.5 wt. % | C  |
| 7.34 wt. % | H  |
| 7.4 wt. %  | N  |
| 17.4 wt. % | Cl |

What is claimed is:

1. A method for synthesizing a crystalline silicate having a composition in the anhydrous state, expressed in terms of mole ratios of oxides, as follows:

(1 to 25)$R_2O$:(0 to 0.8)$M_{2/n}O$:$Al_2O_3$:$(x)SiO_2$ wherein M is at least one alkali metal cation having the valence n, R is dibenzyl-1,4-diazabicyclo[2.2.2]octane and x is from about 5 to greater than about 200, and exhibiting a characteristic X-ray diffraction pattern as shown in Table 1 of the specification, which comprises preparing a mixture containing sources of alkali metal oxide, an oxide of aluminum, an organic nitrogen-containing cation, an oxide of silicon and water and having a composition, in terms of mole ratios, within the following ranges:

| $SiO_2/Al_2O_3$ | 5–250 |
| $H_2O/SiO_2$ | 10–100 |
| $OH^-/SiO_2$ | 0.09–0.8 |
| $R/(R + M)$ | 0.1–0.8 | wherein M and R are as above defined, and maintaining the mixture at a temperature of from about 80° C. to about 150° C. until crystals of the crystalline silicate are formed.

2. The method of claim 1 wherein said mixture has a composition, in terms of mole ratios, as follows:

| $SiO_2/Al_2O_3$ | 10–50 |
| $H_2O/SiO_2$ | 20–80 |
| $OH^-/SiO_2$ | 0.2–0.6 |
| $R/(R + M)$ | 0.1–0.6 |

3. The method of claim 1 wherein said organic nitrogen containing compound is the halide or hydroxide form of dibenzyl-1,4-diazabicyclo[2.2.2]octane.

4. The method of claim 3, wherein said dibenzyl-1,4-diazabicyclo[2.2.2]octane is in the halide form.

5. The method of claim 4 wherein said halide is chloride.

6. A synthetic crystalline silicate having a composition in the anhydrous state, expressed in terms of mole ratios of oxides, as follows:

(1 to 25)$R_2O$:(0 to 0.8)$M_{2/n}O$:$Al_2O_3$:$(x)SiO_2$ wherein M is at least one alkali metal cation having the valence n, R is dibenzyl-1,4-diazabicyclo[2.2.2]octane and x is from about 5 to greater than about 200, and exhibiting a characteristic X-ray diffraction pattern as shown in Table 1 of the specification.

7. The synthetic crystalline silicate of claim 6 wherein M is sodium.

8. A synthetic crystalline silicate having a composition in the anhydrous state, expressed in terms of mole ratios of oxides, as follows:

(1 to 25)$R_2O$:(0 to 0.8)$M_{2/n}O$:$Al_2O_3$:$(x)SiO_2$ wherein R is dibenzyl-1,4-diazabicyclo[2.2.2]octane and x is from about 5 to greater than about 200, wherein M is (a), (b) or mixtures of (a) and (b) and n is the valence of M wherein (a) is at least one alkali metal cation, and wherein (b) is a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements, wherein M is (a) in the as-synthesized synthetic crystalline silicate and wherein M is (b) by ion-exchange of the as-synthesized synthetic crystalline silicate, and which synthetic crystalline silicate exhibits a characteristic X-ray diffraction pattern as shown in Table 1 of the specification.

9. The synthetic crystalline silicate of claim 8 wherein said replacing cation is hydrogen or a hydrogen precursor.

10. The synthetic crystalline silicate of claim 11 wherein said replacing cation is hydrogen or a hydrogen precursor.

11. The synthetic crystalline silicate of claim 8, wherein M is sodium.

12. A reaction mixture for use in synthesis of a crystalline silicate which comprises one or more sources of alkali metal oxide, an oxide of aluminum, an organic nitrogen-containing cation, an oxide of silicon and water whereby the mixture composition, in terms of mole ratios, is within the following ranges:

| $SiO_2/Al_2O_3$ | 5–250 |
| $H_2O/SiO_2$ | 10–100 |
| $OH^-/SiO_2$ | 0.09–0.8 |
| $R/(R + M)$ | 0.1–0.8 | wherein M is at least one alkali metal cation and R comprises dibenzyl-1,4-diazabicyclo[2.2.2]octane.

* * * * *